(12) United States Patent
Baz et al.

(10) Patent No.: US 9,384,139 B2
(45) Date of Patent: Jul. 5, 2016

(54) MAINTAINING A SYSTEM STATE CACHE

(71) Applicant: Mellanox Technologies Ltd., Yokneam (IL)

(72) Inventors: Itai Baz, Haifa (IL); Amir Dahan, Haifa (IL)

(73) Assignee: Mellanox Technologies Ltd., Yokneam (IL)

( * ) Notice: Subject to any disclaimer, the term of this patent is extended or adjusted under 35 U.S.C. 154(b) by 175 days.

(21) Appl. No.: 14/265,397

(22) Filed: Apr. 30, 2014

(65) Prior Publication Data
US 2015/0317251 A1 Nov. 5, 2015

(51) Int. Cl.
*G06F 12/08* (2016.01)
*H04L 12/935* (2013.01)

(52) U.S. Cl.
CPC ........ *G06F 12/0875* (2013.01); *H04L 49/3081* (2013.01); *G05B 2219/21049* (2013.01); *G06F 2212/45* (2013.01)

(58) Field of Classification Search
CPC ............................................. G05B 2212/21049
See application file for complete search history.

(56) References Cited

U.S. PATENT DOCUMENTS

| 5,862,338 A * | 1/1999 | Walker ................... H04L 49/351 709/224 |
| 6,260,073 B1 * | 7/2001 | Walker ................... H04L 49/351 370/412 |
| 6,724,759 B1 * | 4/2004 | Chang ..................... H04L 29/06 370/389 |
| 6,968,392 B1 * | 11/2005 | Wilford ............... H04L 12/5601 370/229 |
| 7,904,553 B1 * | 3/2011 | Ham ...................... H04L 41/147 709/217 |
| 2010/0141466 A1 * | 6/2010 | Nguyen .................. H04L 49/30 340/687 |
| 2014/0012966 A1 * | 1/2014 | Baphna ................... H04L 49/70 709/221 |

* cited by examiner

*Primary Examiner* — Nathan Sadler
(74) *Attorney, Agent, or Firm* — D. Kliger IP Services Ltd.

(57) ABSTRACT

Methods, apparatuses and computer software products implement embodiments of the present invention that include storing, to a module memory in each of a plurality of modules having multiple sub-modules, a record containing record entries corresponding respectively to the sub-modules. Upon detecting changes in respective states of the sub-modules of a given module, the corresponding record entries are set in response to the detected changes in the states of the sub-modules of the given module. A cache containing cache entries corresponding respectively to the sub-modules in the plurality of the modules is stored to a controller memory, and the record in each of the modules is polled. Upon detecting that a given record entry of the given module has been set, from the current state information with respect to the given sub-module is requested and received, and a corresponding cache entry is updated in the cache with the current state information.

19 Claims, 3 Drawing Sheets

MAINTAINING A SYSTEM STATE CACHE

FIELD OF THE INVENTION

The present invention relates generally to system management, and specifically to maintaining a system state cache.

BACKGROUND

In systems comprising multiple modules having respective multiple sub-modules, a controller in communication with the modules can maintain a system state cache that stores a current state of each of the sub-modules. In the event of a change in a state of a given sub-module in a given module, the given module can transmit a state change event report to the controller, and upon receiving the report, the controller can refresh the system state cache to reflect the change in the state of the given sub-module. The process of refreshing the system state cache in response to receiving the report is known as an event-driven refresh of the cache.

The description above is presented as a general overview of related art in this field and should not be construed as an admission that any of the information it contains constitutes prior art against the present patent application.

SUMMARY

There is provided, in accordance with an embodiment of the present invention an apparatus, including a plurality of modules, each of the modules including multiple sub-modules, a module memory configured to store a record containing multiple record entries corresponding respectively to the multiple sub-modules, and a module processor configured to detect changes in respective states of the sub-modules, and to set the corresponding record entries in response to the detected changes in the states of the sub-modules. The apparatus also includes a controller including a controller memory configured to store a cache containing cache entries corresponding respectively to the sub-modules in the plurality of the modules, and a controller processor configured to poll the record in each of the modules, and upon detecting that a given record entry, corresponding to a given sub-module, has been set, to request and receive from the module processor, current state information with respect to the given sub-module and to update a corresponding cache entry in the cache with the current state information.

In a disclosed embodiment, upon updating the corresponding cache entry in the cache with the current state information, the controller processor is configured to reset the given record entry.

In additional embodiments, the module processor of any given module is configured, upon detecting a change in a state of a sub-module of the given module, to transmit an event report to the controller, and wherein the controller processor is configured, in response to the event report, to update the cache with respect to the change in the state. In further embodiments, the event report indicates the change in the state of the sub-module of the given module, and wherein upon updating the cache with respect to the change in the state, the controller processor is configured to reset the record entry corresponding to the sub-module of the given module.

In some embodiments, the record includes a bitmap, and wherein each of the record entries includes a respective bit in the bitmap. In one embodiment, the sub-module may include an input/output port.

In supplemental embodiments, the apparatus may include a transport mechanism coupling the plurality of the modules to the controller, and wherein the controller is configured, via the transport mechanism, to poll the records and to request and receive the current state information. In some embodiments, in response to receiving the request, the given module processor is configured to determine the current state information with respect to the given sub-module, and to transmit the determined current state information to the controller.

There is also provided, in accordance with an embodiment of the present invention a method, including storing, to a module memory in each of a plurality of modules having a module processor and multiple sub-modules, a record containing multiple record entries corresponding respectively to the multiple sub-modules, detecting, by a given module processor of a given module, changes in respective states of the sub-modules of the given module, setting, by the given module processor, the corresponding record entries in response to the detected changes in the states of the sub-modules of the given module, storing, to a controller memory, a cache containing cache entries corresponding respectively to the sub-modules in the plurality of the modules, polling, by a controller processor, the record in each of the modules, and upon the controller processor detecting that a given record entry of the given module has been set, requesting and receiving from the given module processor, current state information with respect to the given sub-module, and updating a corresponding cache entry in the cache with the current state information.

There is further provided, in accordance with an embodiment of the present invention a computer software product, the product comprising a non-transitory computer-readable medium, in which program instructions are stored, which first instructions, when read by a plurality of modules comprising multiple sub-modules, cause each of the modules to store, to a module memory, a record containing multiple record entries corresponding respectively to the multiple sub-modules, to detect changes in respective states of the sub-modules, and to set the corresponding record entries in response to the detected changes in the states of the sub-modules. The computer software product also includes second instructions, when read by a controller, cause the controller to poll the record in each of the modules, and upon detecting that a given record entry, corresponding to a given sub-module, has been set, to request and receive current state information with respect to the given sub-module, and to update a corresponding cache entry in the cache with the current state information.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
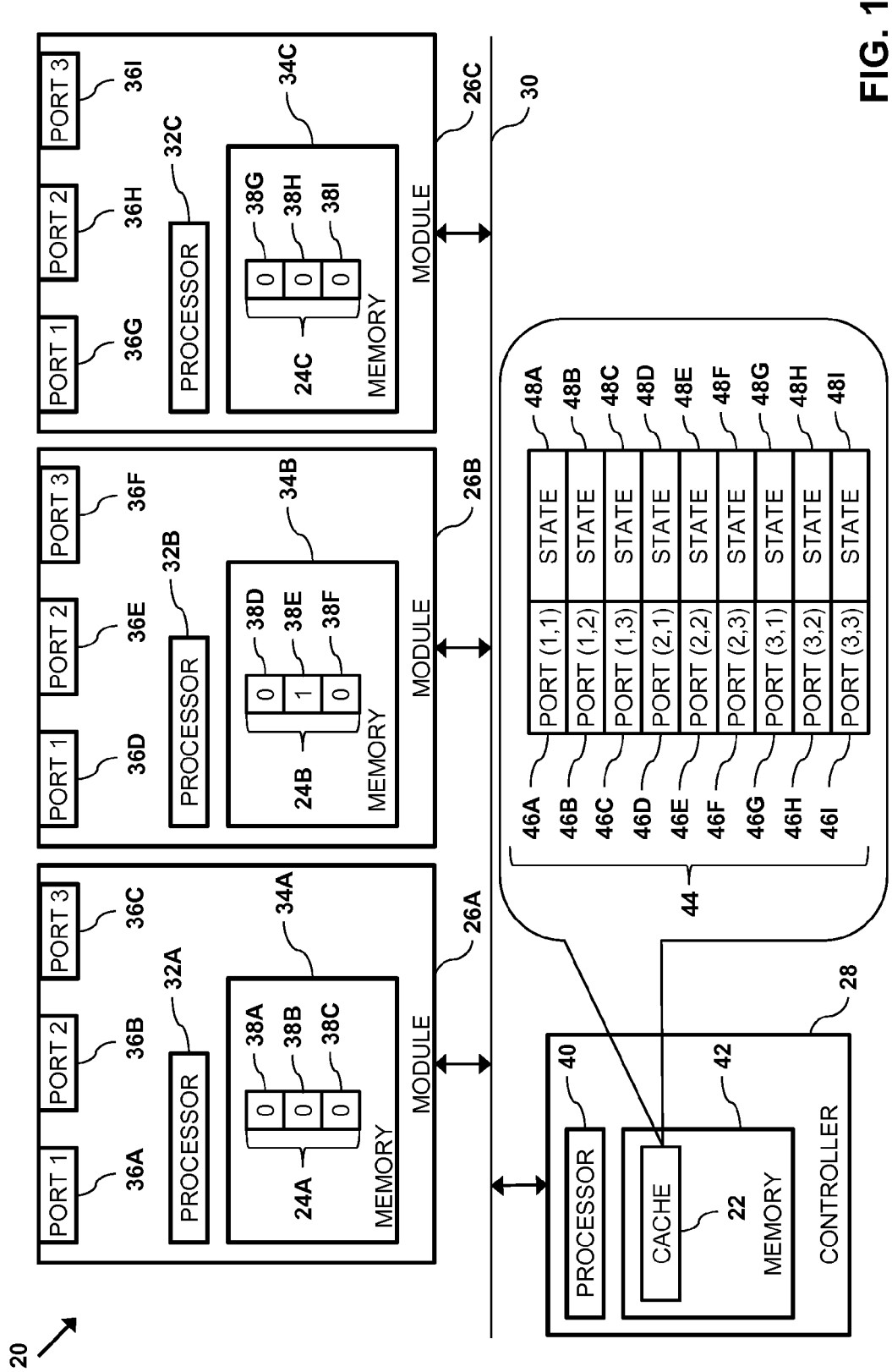
FIG. 1 is a block diagram that schematically illustrates a system comprising multiple modules in communication with a controller via a bus, in accordance with an embodiment of the present invention.

Embodiments of the present invention provide methods and systems for complementing event driven refreshes with bitmap polling, in order to maintain a system state cache (also referred to herein as the cache). As described hereinbelow, the system may comprise a controller in communication a plurality of modules via a transport mechanism, each module comprising multiple sub-modules. For example, the system may comprise a network switch having multiple modules, and each sub-module may comprise an input/output (I/O) port.

In some embodiments, the transport mechanism may comprise a hardware bus such as an Inter-Integrated Circuit ($I^2C$) bus. In alternative embodiments the transport mechanism may comprise a network connection such as an InfiniBand™ fabric.

To initialize a given module, a record containing multiple record entries corresponding respectively to the multiple sub-modules can be stored to a memory in each module. In some embodiments, the record in each module's memory may comprise a bitmap comprising multiple bits, and each record entry may comprise a given bit. Additionally, a cache containing cache entries corresponding respectively to the sub-modules in the plurality of the modules may be stored to the controller's memory.

Upon detecting a change in respective states of the sub-modules of a given module, the given module can set the record entries corresponding to the sub-modules of the given module. In embodiments of the present invention, the controller can periodically poll (i.e., at a polling interval) the record in each of the modules, and upon detecting that a given record entry of the given module has been set, the controller can request and receive, from the given module via the transport mechanism, current state information with respect to the given sub-module, and update a corresponding cache entry in the cache with the current state information.

One problem with event driven cache refreshes is that some hardware transport mechanisms may not be 100% reliable, and there is consequently a chance that a state change event report sent from a given module or sub-module will not reach the controller. Therefore, systems implementing embodiments with embodiments described herein can help ensure that the cache reflects the correct hardware states of the system with a maximal latency of one polling interval. In operation, most state changes will be reflected almost immediately by event driven cache refreshes, and only small amount of changes will be reflected in the next polling interval.

Reading a state of a sub-module can be a time-intensive operation, and is typically only performed upon receiving a state change event report. On the other hand, since the records in the modules are typically small, they can be polled fairly quickly. Therefore, embodiments of the present can reduce the time required to update the system state cache subsequent to a hardware change that changes a state of a given sub-module. Typically, each hardware change triggers a single refresh activity (i.e., either polling or an event driven refresh), except in rare cases when polling the record and receiving the state change event report occur simultaneously.

System Description

FIG. 1 is a block diagram that schematically illustrates a system 20 configured to maintain a system state cache 22 by polling records such as bitmaps 24. System 20 comprises modules 26 and a controller 28 that communicate over a bus 30, such as an Inter-Integrated Circuit ($I^2C$) bus, that couples the modules to the controller. While the example in FIG. 1 shows controller 28 coupled to modules 26 via bus 30, the controller may be coupled to the modules via any other type of transport mechanism, such as an InfiniBand™ fabric.

In the configuration shown in FIG. 1, the modules and their respective components can be differentiated by appending a letter to the identifying numeral, so that the modules comprise modules 26A, 26B and 26C. System 20 may comprise, for example, a high-speed packet switch, in which modules 26 are switching cores, with sub-modules corresponding to input/output (I/O) ports of the switch. Alternatively, the principles of the present invention may be applied in management of other sorts of complex, multi-module systems.

Each module 26 comprises a module processor 32, a module memory 34 and multiple sub-modules, in this case I/O ports 36. In the configuration shown in FIG. 1, I/O ports 36 can be differentiated by appending a letter to the identifying numeral, so that module 26A comprises ports 36A-36C, module 26B comprises ports 36D-36F, and module 26C comprises ports 36G-36I. Although system 20 is shown and described herein, for the sake of simplicity, as comprising three modules with three ports per module, in practice such a system may typically comprise substantially any number of modules, with a much larger number of ports per module.

As described supra, each module 26 has a record containing multiple record entries corresponding respectively to the multiple sub-modules (e.g., ports 36) in the module. In the example shown in FIG. 1, the record comprises a bitmap 24 comprising bits 38 that is stored in memory 34. As described hereinbelow, bits 38 are initially "not set" (i.e., store "0"), and upon a given processor 32 detecting a change in state of a given port 36, the processor sets (i.e., stores "1" to) the bit associated with the given port. Alternatively, bits 38 may be "set" to the value "0" and reset to the value "1."

Bitmaps 24 and bits 38 are differentiated in the present description and in FIG. 1 by appending a letter to the identifying numeral, so that memory 34A stores bitmap 24A comprising bits 38A-38C, memory 34B stores bitmap 24B comprising bits 38D-38F, and memory 34C stores bitmap 24C comprising bits 38G-38I. In the example shown in FIG. 1, bit 38A corresponds to port 36A, bit 38B corresponds to port 36B, bit 38C corresponds to port 36C, bit 38D corresponds to port 36D, bit 38E corresponds to port 36E, bit 38F corresponds to port 36F, bit 38G corresponds to port 36G, bit 38H corresponds to port 36H, and bit 38I corresponds to port 36I.

Controller 28 comprises a controller processor 40 and a controller memory 42 that stores a system state cache 22. System state cache 22 has multiple cache entries 44, each of the cache entries comprising a port identifier 46 and a port state 48. The port state may indicate, for example, whether or not a cable is connected to the given port and, if so, an identity of the cable, the current link speed and other operating parameters of the port.

Port identifiers 46 and port states 48 can be differentiated by appending a letter to the identifying numeral, so that the port identifiers comprise port identifiers 46A-46I and the port states comprise port states 48A-48I. In the example shown in FIG. 1, the cache entry comprising port identifier 46A and port state 48A corresponds to port 36A, the cache entry comprising port identifier 46B and port state 48B corresponds to port 36B, the cache entry comprising port identifier 46C and port state 48C corresponds to port 36C, the cache entry comprising port identifier 46D and port state 48D corresponds to port 36D, the cache entry comprising port identifier 46E and port state 48E corresponds to port 36E, the cache entry comprising port identifier 46F and port state 48F corresponds to port 36F, the cache entry comprising port identifier 46G and port state 48G corresponds to port 36G, the cache entry comprising port identifier 46H and port state 48H corresponds to port 36H, and the cache entry comprising port identifier 46I and port state 48I corresponds to port 36I.

Each port 36 may be referenced by an ordered pair (A,B), where A is a number referencing a given module 26, and B is a number referencing a given port 36. In the example shown in FIG. 1, ordered pair (1,1) references port 36A, ordered pair (1,2) references port 36B, ordered pair (1,3) references port 36C, ordered pair (2,1) references port 36D, ordered pair (2,2) references port 36E, ordered pair (2,3) references port 36F, ordered pair (3,1) references port 36G, ordered pair (3,2) references port 36H, and ordered pair (3,3) references port 36I.

Processors 32 and 40 may comprise general-purpose central processing units (CPU) or special-purpose embedded processors, which are programmed in software or firmware to carry out the functions described herein. The software may be downloaded to modules 26 and controller 28 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

System Event Handling

Figure 2:
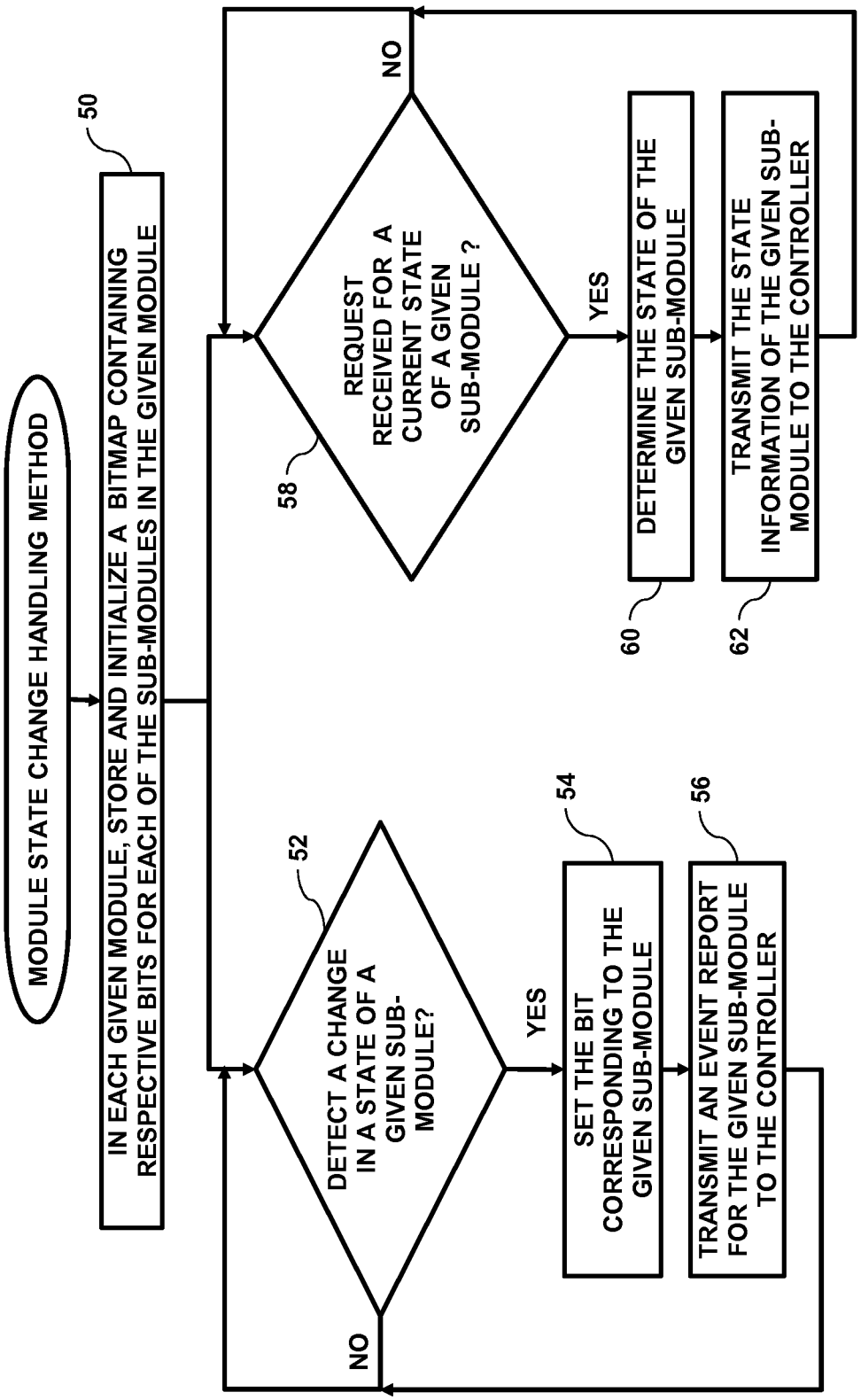
FIG. 2 is a flow diagram that schematically illustrates a method for a given module to handle an event comprising a change in state of a given sub-module of the given module, in accordance with an embodiment of the present invention.

FIG. 2 is a flow diagram that schematically illustrates a method for a given module 26 to detect and handle a change in a state of a given port 36, in accordance with an embodiment of the present invention. While embodiments herein describe detecting and handling a change in a state of a given port 36, detecting and handling a change in a state of any device in a given module 26 is considered to be within the spirit and scope of the present invention.

In the flow diagram shown in FIG. 2, a given module processor 32 can perform steps 52-56 and steps 58-62 concurrently. As explained hereinbelow, the given module processor performs steps 54-56 upon detecting a change in a state of a given port 36, and performs steps 60-62 upon receiving a request for a current state of the given port (or any port 36). In some embodiments, steps 52-56 may be executed on a first thread (also known as a logical core) of each module processor 32 and steps 58-62 may be executed on a second thread of each of the module processors.

In a module initialization step 50, each processor 32 stores a bitmap 24 to its respective memory 34, and initializes the bitmap. As described supra, each port 36 in a given module has a corresponding bit 38 in bitmap 24. In embodiments described hereinbelow, storing a "1" to a given bit 38 (also referred to herein as setting the given bit) indicates that there is a change in a state of the port associated with the given bit, and storing a "0" to the given bit (also referred to herein as resetting the given bit) indicates that there is no change in the state of the port associated with the given bit. Therefore, to initialize bitmaps 24, processors 32 resets each bit 38.

In a first comparison step 52, a given module processor 32 waits to detect a change in a state of a given port 36. Upon a given module processor 32 detecting a change in a state of a given port 36, then in a set step 54, the given module processor sets a given bit 38 that corresponds to the given port. In the example shown in FIG. 1, processor 32B has detected a change in a state of port 36E, and has set bit 38E in response to detecting the change. In a transmit step 56, the given module processor transmits, via bus 30 to controller 28, an event report indicating the change in the state of the given sub-module, and the method continues with step 52.

In embodiments where the change in the state comprises a cable (not shown) either being plugged into the given port or a being unplugged from the given port, the event report typically includes information such as the given module, the given port, and the specific event, i.e., either the cable being plugged in or the cable being unplugged. If the event comprises a cable being plugged into the given port, then the event report may include additional information such as information on the cable that was plugged in. Additional examples of events that can trigger event reports include, but are not limited to:

An operational state of a given port 36. The operational state of a given port can change if a status of "neighbor" (i.e., a device in communication with the system via the given port) changes.

A change in communication speed of a given port 36.

While steps 54 and 56 describe a given module processor 34 detecting and conveying an indication of a change in a state of a given port 36, detecting and conveying the change in the state of the given port by a different component of module 26, is considered to be within the spirit and scope of the present invention. For example, each given port 36 may contain its own logic that can detect and convey, to controller 28 via bus 30, an event report indicating a change in a state of the given port.

In a second comparison step 58, a given module processor waits to receive a request for a current state of a given port 36. Upon the given module processor receiving, from controller 28, a request for a current state of a given port 36, the given module processor determines the current state of the given port in a determination step 60, transmits the identified state to the controller in a transmission step 62, and the method continues with step 58.

Figure 3:
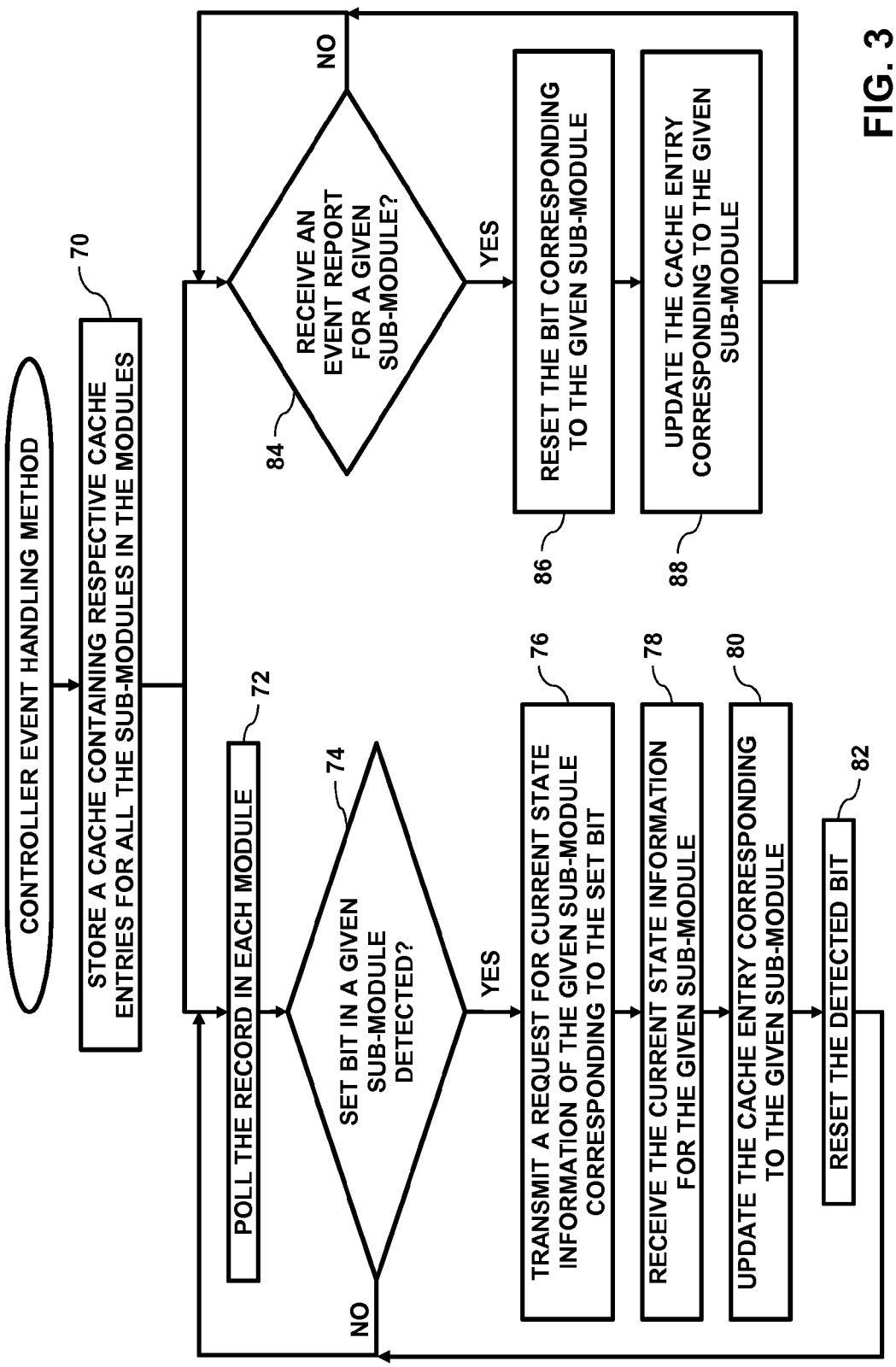
FIG. 3 is a flow diagram that schematically illustrates a method for the controller to handle the event, in accordance with an embodiment of the present invention.

FIG. 3 is a flow diagram that schematically illustrates a method for controller 28 to detect and handle an event comprising a change in a state of given port 36, in accordance with an embodiment of the present invention. In the flow diagram shown in FIG. 2, a controller processor 40 can perform steps 72-82 and steps 84-88 concurrently. As explained hereinbelow, processor 40 performs steps 76-82 upon detecting a a given bit 38 that is set, and performs steps 86-88 upon receiving from a given module 26, an event report for a given port 36. In some embodiments, steps 72-82 may be executed on a first thread of processor 40, and steps 84-88 may be executed on a second thread of the controller processor.

In a controller initialization step 70, processor 40 creates and stores cache 22 to memory 42. Cache 22 contains respective cache entries 44 for each port 36. In embodiments of the present invention, each of the entries comprises a given port identifier 46 (e.g., identifier 46A) and its associated port state 48 (e.g., state 48A).

In a polling step 72, processor 40 polls, via bus 30 (or any other type of transport mechanism), each bitmap 24 to identify a change in a state in any port 36. In some embodiments, processor 40 polls bitmaps 24 using remote direct memory access (RDMA), which typically has little or no performance impact on system 20. While polling the bitmaps, controller 28 can implement the following pseudo-code to read bitmaps 24:

For each polled hardware module Mi
  While ((Bi=Read Mi Bitmap)>0)
    Sub system Sj=first set bit in Bi
    Clear for Module Mi bit j
    Read hardware state of module Mi sub module Sj In the pseudo-code listed above, Mi indicates a given module 26, Bi indicates a given bitmap 24, and Sj indicates a given sub-module (i.e., a given port 36).

In a first comparison step 74, if processor 40 detects, in a given module 26, a given bit 38 that is set, then in a transmission step 76, the controller processor transmits, to the given module, a request for the current state information of a given port 36 that corresponds to the set bit. In a receive step 78, processor 40 receives, in response to the request, the current state information for the given port. Upon receiving the state information for the given port, the controller processor updates port state 48 of a given cache entry 44 that corresponds to the given port (i.e., the given cache entry whose respective port identifier 46 references the given port) in a first update step 80, and resets the given bit in a first reset step 82, and the method continues with step 72.

Returning to step 74, if processor 40 does not detect, in bitmaps 24, a given bit 38 that is set, then the method continues with step 72.

In a second comparison step 84, processor 40 waits to receive an event report. Upon processor 40 receiving, from a given module 26 for a given port 36, then the controller processor resets the given bit that corresponds to the given port in a second reset step 86, updates the given cache entry 44 that corresponds to the given port in a second update step 88, and the method continues with step 84.

In embodiments described herein, system 20 complements event driven refreshes of cache 22 with polling bitmaps 24. While the steps in the flow diagram shown in FIG. 3 describe processor 40 detecting a change in a state of a single given port 36, and updating the cache entry corresponding to the given port, the steps described in the flow diagram may detect a change in a state of two different port, and updating the two corresponding cache entries.

For example, processor 40 can poll bitmaps 24 at a specific polling interval. In steps 74-82, upon polling the bitmaps, processor 40 may detect a set bit 38 that is associated with a first port 36, and receive an event report for a second port 36 in steps 84-88. In this example, processor 40 receives the event report in-between polling bitmaps 24 at the polling interval.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A network switch, comprising:
    a plurality of switching cores, each of the switching cores comprising:
        multiple input/output ports for network communication;
        a switching-core memory configured to store a record containing multiple record entries corresponding respectively to the multiple ports; and
        a switching-core processor configured to:
            (i) detect changes in respective states of the ports of the switching core, and, in response to the detected changes, set the corresponding record entries and transmit respective event reports indicating the changes, and
            (ii) receive a request for current state information with respect to one of the ports of the switching core, and, in response to the request, transmit the current state information; and
    a controller comprising:
        a controller memory configured to store a cache containing cache entries corresponding respectively to the ports in the plurality of the switching cores; and
        a controller processor configured to:
            (a) periodically poll the record in each of the switching cores, and upon detecting that a given record entry, corresponding to a given port of a given switching core, has been set, transmit the request for current state information with respect to the given port, receive the current state information from the switching-core processor of the given switching core, and update a corresponding cache entry in the cache with the current state information, and
            (b) receive the event reports indicating the changes in respective states of the ports, and, in response to the event reports, update the cache with respect to the changes.

2. The network switch according to claim 1, wherein upon updating the corresponding cache entry in the cache with the current state information, the controller processor is configured to reset the given record entry.

3. The network switch according to claim 1, wherein upon updating a particular cache entry, corresponding to a particular one of the ports, in response to a particular one of the event reports, the controller processor is configured to reset the record entry corresponding to the particular one of the ports.

4. The network switch according to claim 1, wherein the record comprises a bitmap, and wherein each of the record entries comprises a respective bit in the bitmap.

5. The network switch according to claim 1, and comprising a transport mechanism coupling the plurality of the switching cores to the controller, and wherein the controller is configured, via the transport mechanism, to poll the records and to request and receive the current state information.

6. The network switch according to claim 1, wherein the switching-core processor of each of the switching cores is configured to concurrently perform (i) and (ii).

7. The network switch according to claim 6, wherein the switching-core processor of each of the switching cores is configured to concurrently perform (i) and (ii) by executing (i) on a first thread of the switching-core processor, and executing (ii) on a second thread of the switching-core processor.

8. The network switch according to claim 1, wherein the controller processor is configured to concurrently perform (a) and (b).

9. The network switch according to claim 8, wherein the controller processor is configured to concurrently perform (a) and (b) by executing (a) on a first thread of the controller processor, and executing (b) on a second thread of the controller processor.

10. A method, comprising:
    storing, to a respective switching-core memory in each of a plurality of switching cores of a network switch, each of the switching cores having a switching-core processor and multiple input/output ports for network communication, a record containing multiple record entries corresponding respectively to the multiple ports of the switching core;
    using the switching-core processor of a given switching core of the plurality of switching cores:
        (i) detecting changes in respective states of the ports of the given switching core, and, in response to the detected changes, setting the corresponding record entries and transmitting respective event reports indicating the changes, and
        (ii) receiving a request for current state information with respect to a given one of the ports of the switching core, and, in response to the request, transmitting the current state information;
    storing, to a controller memory of a controller of the network switch, a cache containing cache entries corresponding respectively to the ports in the plurality of the switching cores; and
    using a controller processor of the controller:
        (a) periodically polling the record in each of the switching cores, and, upon detecting that a given record entry, corresponding to the given one of the ports of the given switching core, has been set, transmitting the request for current state information with respect to the given one of the ports, receiving the current state information from the switching-core processor of the given switching core, and updating a corresponding cache entry in the cache with the current state information, and (b) receiving the event reports indicating the changes in respective states of the ports, and, in response to the event reports, updating the cache with respect to the changes.

11. The method according to claim 10, and comprising resetting the given record entry upon updating the corresponding cache entry in the cache with the current state information.

12. The method according to claim 10, and comprising, upon updating a particular cache entry, corresponding to a particular one of the ports, in response to a particular one of the event reports, resetting, by the controller processor, the record entry corresponding to the particular one of the ports.

13. The method according to claim 10, wherein the record comprises a bitmap, and wherein each of the record entries comprises a respective bit in the bitmap.

14. The method according to claim 10, wherein the controller is configured to poll the records and to request and receive the current state information via a transport mechanism coupling the plurality of the switching cores to the controller.

15. The method according to claim 10, comprising, using the switching-core processor of the given switching core, concurrently performing (i) and (ii).

16. The method according to claim 15, wherein concurrently performing (i) and (ii) comprises executing (i) on a first thread of the switching-core processor, and executing (ii) on a second thread of the switching-core processor.

17. The method according to claim 10, comprising, using the controller processor of the controller, concurrently performing (a) and (b).

18. The method according to claim 17, wherein concurrently performing (a) and (b) comprises executing (a) on a first thread of the controller processor, and executing (b) on a second thread of the controller processor.

19. A computer software product, the product comprising a non-transitory computer-readable medium, in which program instructions are stored, the program instructions including:

first instructions, which, when read by a respective switching-core processor of each switching core of a plurality of switching cores belonging to a network switch, each of the switching cores comprising multiple input/output ports for network communication, cause the switching-core processor:

to store, to a memory of the switching core, a record containing multiple record entries corresponding respectively to the multiple ports of the switching core;

to detect changes in respective states of the ports of the switching core, and, in response to the detected changes, to set the corresponding record entries and transmit respective event reports indicating the changes; and to receive a request for current state information with respect to one of the ports of the switching core, and, in response to the request, transmit the current state information; and second instructions, which, when read by a controller processor of a controller of the network switch, cause the controller processor:

to periodically poll the record in each of the switching cores, and, upon detecting that a given record entry, corresponding to a given port of a given switching core of the switching cores, has been set, transmit the request for current state information with respect to the given port, receive the current state information from the switching-core processor of the given switching core, and update a corresponding cache entry in a cache, which is stored in a memory of the controller, with the current state information, and to receive the event reports indicating the changes in respective states of the ports, and, in response to the event reports, update the cache with respect to the changes.

* * * * *